United States Patent Office 3,227,776
Patented Jan. 4, 1966

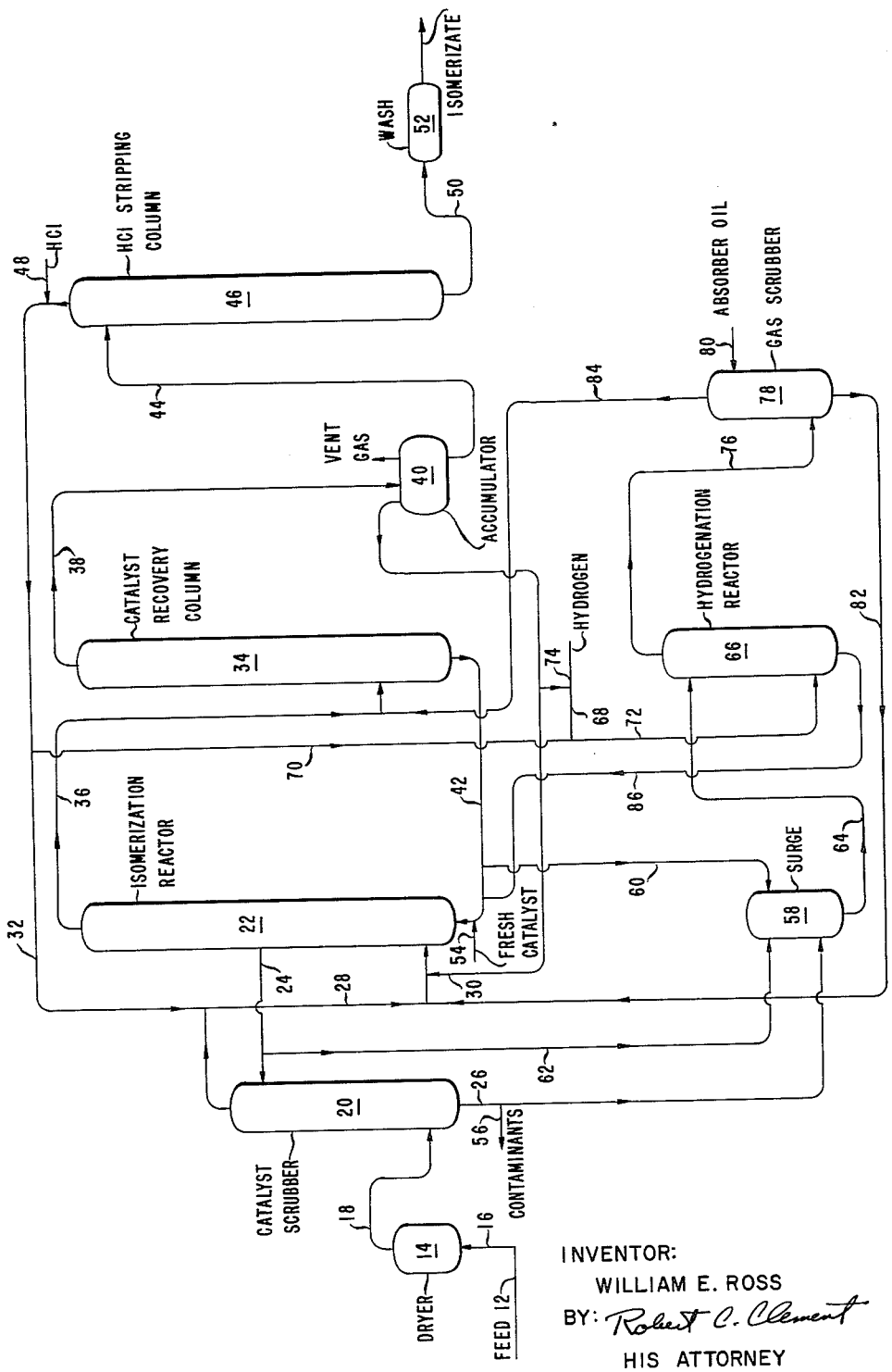

3,227,776
CATALYST RECOVERY IN AN ALUMINUM HALIDE-CATALYZED CONVERSION PROCESS
William E. Ross, El Cerrito, Calif., assignor to Shell Oil Company, New York, N.Y., a corporation of Delaware
Filed May 31, 1963, Ser. No. 286,107
8 Claims. (Cl. 260—683.74)

This is a continuation-in-part of copending application Serial No. 203,050, filed June 18, 1962, now abandoned.

This invention relates to the recovery of aluminum halide from an aluminum halide-hydrocarbon sludge formed during the conversion of hydrocarbons in the presence of an aluminum halide catalyst.

The use of Friedel-Crafts type catalyst such as aluminum halide for the conversion of hydrocarbons, either alone or in the presence of such added promoters as hydrogen halide, organic halides, etc., is well known. In practically all of these processes, the aluminum halide, such as, for example, aluminum trichloride or aluminum tribromide, is gradually converted to an aluminum halide-hydrocarbon sludge. The catalyst apparently forms complex compounds with the hydrocarbons undergoing treatment and in so doing, its catalytic activity is diminished or eliminated. The sludge or conjunct polymer (as it is sometimes called) is an exceedingly complex mixture of highly olefinic, conjugated and cyclic hydrocarbons, formed by a combination of reactions such as polymerization, hydrogen transfer and cyclization, and varies from black, tarry or resinous type material to light red oils. Throughout this specification and claims, the term "aluminum halide-hydrocarbon sludge" or the term "aluminum halide sludge" is intended to designate the reaction product of an aluminum halide with a hydrocarbon or hydrocarbon mixture.

In present commercial processes, the sludge is discarded after dilution with water to render it innocuous. Of course the catalyst lost in the sludge and the cost of disposing of the sludge makes these processes expensive. In many cases, these high costs have hindered the commercial exploitation of the Friedel-Crafts catalyst.

Many methods have been suggested for the recovery of aluminum halide from an aluminum halide sludge. Suggested methods included distillation, coking, destructive hydrogenation of the hydrocarbon complex, decomposition of the aluminum halide to aluminum oxide and hydrogen halide, etc. However, these processes are inefficient and still result in substantial catalyst losses. Moreover, all such methods involve difficulties in handling the aluminum halide due to the volatility of the catalyst, the extremely corrosive nature of the aluminum halide, its tendency to further complex with the catalyst, etc.

It has now been found in accordance with the present invention that the aluminum halide catalyst is efficiently recovered from the sludge when hydrogenated in the presence of antimony halide. The drawing illustrates a preferred flow diagram for carrying out the process of the invention.

When sludge is hydrogenated in the presence of antimony halide, such as antimony chloride, antimony bromide, etc., the efficiency of hydrogenation of sludge is much greater. This is particularly surprising as it is known that antimony halides are not hydrogenation catalysts.

Two samples of aluminum chloride sludge obtained during the isomerizaiton of $C_5/C_6$ paraffins were hydrogenated under comparable conditions in a magnetically stirred autoclave. Sample A contained 10 grams of aluminum chloride sludge. Sample B contained 10 grams of aluminum chloride sludge and 100 grams of antimony chloride. Neither sample contained any separately added aluminum chloride or any extraneous hydrogenation catalyst. The autoclaves were pressured with hydrogen. The results are set forth in Table I.

Table I
REACTION EFFICIENCY

| | Sample A | Sample B |
| --- | --- | --- |
| Aluminum chloride sludge, grams | 10 | 10 |
| Antimony chloride, grams | | 100 |
| Hydrogen partial pressure, p.s.i.: | | |
| Initial | 1,325 | 1,325 |
| Terminal | 1,190 | 1,290 |
| Temperature, °C | 175 | 175 |
| Reaction time, min | 120 | 120 |
| Percent aluminum chloride recovered from complex | 43 | 97 |

It is evident that hydrogenating the sludge alone is an inefficient means of recovering aluminum halide as compared to the hydrogenation of sludge in the presence of antimony halide. Superior hydrogenation efficiency is realized when antimony halide is used in concentrations as low as 0.5 percent weight, calculated on the basis of total antimony halide plus sludge. More substantial benefits are obtained when antimony halide is present from about 5 to 99 percent weight, and especially from 45 to 95 percent weight, calculated on the same basis.

The antimony halide also provides corrosion protection for the system at the high temperatures required for hydrogenating the sludge or the temperatures required in the rest of the system. Nickel (Grade A) strips (1/8" x 3/4" x 3") were placed in an autoclave containing aluminum chloride and various amounts of antimony chloride. The temperature of the autoclave was maintained at 200° C. for 24 hours. The strip in 100% aluminum chloride was used as a base for comparing corrosion rates. The results are shown in Table II.

Table II
ALUMINUM HALIDE CORROSION INHIBITOR

| Composition | | |
| --- | --- | --- |
| Aluminum chloride, percent weight | 99.5 | 20.0 |
| Antimony chloride, percent weight | 0.5 | 80.0 |
| Corrosion rate as percent of rate with pure aluminum chloride | 49 | 29 |

This example illustrates that for a typical sludge (about 50 percent weight aluminum chloride) which has been hydrogenated to recover free aluminum chloride, the addition of at least about .5 percent weight antimony chloride, basis aluminum chloride (or about .25 percent weight basis sludge), substantially reduces the corrosion normally induced by the free aluminum chloride.

Some of the additional advantages of this invention are that the recovered aluminum halide can be handled at lower temperatures and pressures when in admixture with antimony halide than when handled as pure aluminum halide. This permits, for example, low temperature isomerization of low molecular weight hydrocarbons, e.g., butane, pentane or hexane, in a self-contained unit without intermediate makeup facilities. The presence of antimony halide also suppresses the volatility of aluminum halide so that the aluminum halide can be recovered as a liquid.

The hydrogenation conditions for converting the sludge to free aluminum halide and hydrocarbons are a temperature range from about 150° C. to about 250°

C. and a hydrogen partial pressure from about 200 p.s.i. to about 2500 p.s.i. The preferred hydrogenation conditions are a temperature range from about 175° C. to about 225° C. and a hydrogen partial pressure from about 400 p.s.i. to about 1400 p.s.i. Reaction contact time varies from 5 minutes to about 10 hours depending upon type of sludge, reaction design, contacting efficiency, temperature, etc. The preferred contacting periods are from about 5 minutes to about 3 hours.

The hydrogen should be essentially dry and is desirably free from hydrogen sulfide. The hydrogen consumption varies from about 5 standard cubic feet per pound hydrocarbon in sludge to about 36 standard cubic feet per pound hydrocarbon in sludge. It is desirable to use a hydrogen feed rate to the reactor of up to 10 times the hydrogen consumption in order to maintain high partial pressure over the reactor length, and preferably the hydrogen feed rate of the reactor is from about 2 to about 4 times the hydrogen consumption.

It is generally desirable to hydrogenate the sludge and antimony chloride mixture in the presence of a hydrogen halide such as hydrogen chloride or hydrogen bromide to suppress decomposition of the antimony chloride. The amount of hydrogen halide present is suitably from about 2% to about 20% by volume basis total hydrogen plus hydrogen halide. The preferred amount is from about 4% to about 12% by volume basis total hydrogen plus hydrogen halide.

There are inherently certain catalyst losses in Friedel-Crafts conversion processes because of hydration of aluminum halide with water present in the system, pump gland loss, etc. However, these losses are minor in comparison to the catalyst heretofore lost as sludge. When the hydrogenation process of the invention is combined with an aluminum halide-catalyzed conversion process, addition of makeup catalyst to the conversion process is generally unnecessary except to replace these minor losses.

For example, a $C_5/C_6$ paraffin feed stock having the following composition was isomerized using aluminum chloride catalyst in admixture with antimony chloride at 85° C. reactor temperature, 250 p.s.i.g. reactor pressure, 5 to 6 percent weight hydrogen chloride as a promotor and 3 percent m. hydrogen as a cracking inhibitor:

*Table IV*

FEED COMPOSITION, PERCENT WEIGHT

| | |
|---|---|
| Propane | 0.3 |
| Isobutane | 1.7 |
| n-Butane | 6.7 |
| Isopentane | 11.0 |
| n-Pentane | 25.6 |
| Cyclopentane | 5.3 |
| Dimethyl butane | 1.5 |
| Methylpentane | 22.8 |
| n-Hexane | 11.7 |
| Methylcyclopentane | 11.4 |
| Cyclohexane | 0.5 |
| Benzene | 1.5 |

At the end of the line-out period of 44 hours, during which time fresh aluminum chloride was continuously added to the system to compensate for that lost in the sludge, the ratio of isopentane to total $C_5H_{12}$ hydrocarbon in the isomerizate was 70 percent weight.

Thereafter, no fresh aluminum trichloride was added to the isomerization process. However, the rejected sludge was hydrogenated in the presence of an amount of antimony chloride such that the resulting mixture contained 80 percent weight antimony chloride for 1 hour at from 175 to 200° C. reactor temperature and 800 to 1200 p.s.i. hydrogen partial pressure. The recovered aluminum chloride in admixture with antimony chloride was returned to the isomerization process as the only catalyst makeup. At the end of 50 hours operation with only the aluminum chloride that was recovered from the sludge by hydrogenation being added to the isomerization process, the ratio of isopentane to total $C_5H_{12}$ in the isomerizate was 70 percent weight.

It is evident from the equivalent ratios of isopentane in the isomerizate during the period of fresh aluminum chloride addition and the period where only the recovered aluminum chloride was returned to the isomerization process that the hydrogenation process of the present invention can be integrated with the isomerization process to make that process essentially self-sustaining. This embodiment of the invention is especially advantageous in the case of isomerization of $C_5$ and/or $C_6$ feeds, although it is entirely applicable in the isomerization of a broad range of $C_4$ and higher alkanes and cycloalkanes.

The hydrogenation process is suitable for the recovery of aluminum halide from aluminum halide sludges produced from any process utilizing a Friedel-Crafts type catalyst in the presence of a hydrocarbon, in fact, it is broadly applicable to complexes formed in reactions between aluminum halides and hydrocarbons. For example, it is applicable to sludges formed in Friedel-Crafts cracking of hydrocarbons such as naphthas, kerosenes, gas oils, etc., to hydrocarbons of lower molecular weight, in Friedel-Crafts polymerization of normally gaseous olefins to form higher molecular weight hydrocarbons in the gasoline or lubricating oil boiling range, in Friedel-Crafts alkylation of isoparaffinic or aromatic hydrocarbons with olefinic hydrocarbons throughout a wide boiling range, e.g., for the manufacture of ethylbenzene by alkylation of benzene with ethylene, in Friedel-Crafts isomerization of wax, and in the treatment of lubricating oil with aluminum chloride. The integration of the hydrogenation of sludge in accordance with the invention with a hydrocarbon conversion process is exemplified by a paraffin isomerization process employing aluminum chloride in molten antimony chloride.

Referring now to the drawing: a feed stock from line 12 enters the dryer 14 through line 16. Ancillary equipment such as pumps, compressors, heat exchangers, valves, etc., which are obvious to those skilled in the art, are not shown. Feed stocks consist of $C_5/C_6$ alkanes and cycloalkanes. The dried feed passes through line 18 into the bottom of the catalyst scrubber 20 and rises through the scrubber countercurrent to a flowing stream of catalyst pumped from the reactor 22 through line 24. In this manner, the antimony trichloride and active aluminum trichloride in the catalyst phase are extracted into the feed stream and the insoluble aluminum trichloride-hydrocarbon sludge formed by side reactions accompanying isomerization is removed from the catalyst scrubber through line 26. The feed from the scrubber containing dissolved catalyst components is joined in line 28 by recycle hydrogen through line 30 and recycle hydrogen chloride through line 32 and enters the reactor 22. Reaction conditions for the isomerization of a $C_5/C_6$ paraffin stream are for example from about 160 to about 210° F. and about 300 p.s.i. The reaction temperature in this example is 185° F.

The reactor effluent enters the catalyst recovery column 34 through line 36 where isomerizate and lighter materials are distilled overhead through line 38 into accumulator 40. Liquid catalyst components are removed as bottoms and recycled through line 42 to reactor 22. Hydrogen is withdrawn from overhead accumulator 40 and recycled through line 30 to the reactor 22. Alternatively, it is possible to operate without compression facilities using once through hydrogen from say a catalytic reformer. The net overhead liquid passes from the accumulator 40 through line 44 to the hydrogen chloride stripping column 46. Hydrogen chloride gas is recovered overhead and recycled through line 32 to the reactor. Hydrogen chloride can be added to the system as necessary through line 48. The isomerizate is recovered as a bottom product through line 50. It is desirable to give the isomerizate a light caustic treat and water wash in vessel 52 to remove any residual HCl. Fresh catalyst is added to the system through line 54 as necessary to makeup for inherent catalyst losses.

Metals and other contaminants are rejected from the system through line 56. The aluminum chloride-hydrocarbon sludge from line 26 enters surge vessel 58 where the sludge is admixed with antimony chloride such that the admixture contains about 85 percent weight antimony chloride. The antimony chloride can be obtained from catalyst recycle stream 42 through line 60 or it can be obtained from the catalyst being pumped from the reactor through line 24 to the catalyst scrubber and introduced to the surge vessel through line 62. In certain cases it is desirable to by-pass catalyst scrubber 20 with all the aluminum chloride-hydrocarbon sludge which contains antimony chloride and pass this entire stream directly from the isomerization reactor 22 through line 24 and introduce it into the hydrogenation reactor, by-passing the surge vessel through a by-pass line not shown if desired. The sludge and antimony chloride from surge vessel 58 is passed through line 64 and enters the hydrogenation reactor 66. The hydrogenation of the sludge can be either continuous, semi-continuous or batch-wise. Hydrogen via line 68 and hydrogen chloride via line 70 from the isomerization process are introduced into hydrogenation reactor 66 through line 72. Additional hydrogen is added to the system through line 74. The hydrogen is essentially dry and free from hydrogen sulfide. Hydrogenation reactor 66 is of appropriate design to insure intimate contact between the sludge and antimony chloride and the hydrogen and hydrogen chloride. It can for example employ mechanical agitation or it can be a packed or unpacked column employing countercurrent or concurrent contacting techniques. It is preferred to employ a countercurrent contactor to make more effective use of the hydrogen partial pressure. In this example, the hydrogenation conditions for the sludge are 550 p.s.i. hydrogen partial pressure and 200° C. reactor temperature. The residence time of the liquid feed in a countercurrent contactor is approximately ½ hour. Hydrogen consumption is 18 standard cubic feet of hydrogen per pound of hydrocarbon in the sludge. It is preferred to have an excess of hydrogen present in order to maintain high hydrogen partial pressure over the length of the reactor. The hydrogen chloride to hydrogen mol ratio is equal to approximately 0.1 to suppress antimony chloride decomposition.

The gaseous effluent from hydrogenation reactor 66, containing hydrocarbon, hydrogen and hydrogen chloride is passed through line 76 into gas scrubber 78, where the effluent is contacted with absorber oil entering the gas scrubber through line 80. The absorber oil is preferably a hydrocarbon liquid, for example, isomerization feed or isomerizate. The absorber oil contacts the effluent countercurrently and removes the heavier hydrocarbons, HCl and catalyst components. The fat oil is withdrawn from the bottom of the gas scrubber through line 82 and routed to the isomerization reactor 22. The off-gas from the gas scrubber (mainly hydrogen) is withdrawn through line 84 and routed to catalyst removal column 34 or in part to the reactor. The off-gas can alternatively be discarded or routed to gas recovery facilities after being caustic scrubbed to remove the acid gas.

The recovered aluminum chloride catalyst in admixture with the antimony chloride is returned to isomerization reactor 22 through line 86. In some instances this stream can be used to dissolve makeup $AlCl_3$ for process. If the hydrogenation of sludge is done in a batch system, it is desirable to route the recovered catalyst to an intermediate catalyst storage vessel (not shown) from where the catalyst can be continuously returned to the isomerization system. The aluminum chloride catalyst in admixture with antimony chloride can be recovered either as a liquid or a gas. It is preferred to recover the catalyst as a liquid. If the aluminum chloride is to be used as a catalyst without antimony chloride as a carrier, it is possible to remove the aluminum chloride from the antimony chloride by any suitable means such as fractionation.

I claim as my invention:

1. A process for the recovery of aluminum trihalide from aluminum trihalide-hydrocarbon sludge, halide being selected from chloride and bromide, which comprises hydrogenating the sludge in the presence of antimony trihalide under hydrogenation conditions of from about 150° C. to about 250° C. and hydrogen partial pressure of from about 200 p.s.i. to about 2500 p.s.i. to convert the sludge to aluminum trihalide and hydrocarbon.

2. A process for the recovery of aluminum trihalide from aluminum trihalide-hydrocarbon sludge, halide being selected from chloride and bromide, which comprises hydrogenating the sludge in the presence of at least about 0.5 percent weight antimony trihalide, calculated on the basis of total antimony trihalide plus sludge, and hydrogen halide under hydrogenation conditions of from about 150° C. to about 250° C. and hydrogen partial pressure of from about 200 p.s.i. to about 2500 p.s.i. to convert the sludge to aluminum trihalide and hydrocarbon.

3. A process for the recovery of aluminum trihalide from aluminum trihalide-hydrocarbon sludge, halide being selected from chloride and bromide, which comprises hydrogenating the sludge in the presence of about 5 to 99 percent weight antimony trihalide, calculated on the basis of total antimony trihalide plus sludge, and hydrogen halide under hydrogenation conditions of about 175° C. to about 225° C. and hydrogen partial pressures of from about 400 p.s.i. to about 1400 p.s.i. to convert the sludge to aluminum trihalide and hydrocarbon.

4. A process for the recovery of aluminum trichloride from aluminum trichloride-hydrocarbon sludge which comprises hydrogenating the sludge in the presence of about 5 to 99 percent weight antimony trichloride, calculated on the basis of total antimony trichloride plus sludge, and hydrogen chloride under hydrogenation conditions of from about 175° C. to about 225° C. in hydrogen partial pressures of from about 400 p.s.i. to about 1400 p.s.i. to convert the sludge to aluminum trichloride and hydrocarbon.

5. A process for the recovery of aluminum trichloride from an aluminum trichloride-hydrocarbon sludge which comprises hydrogenating the sludge in the presence of about 5 to 99 percent weight antimony trichloride, calculated on the basis of total antimony trichloride plus sludge, and from about 2% to about 20% volume hydrogen chloride, basis hydrogen plus hydrogen chloride, under hydrogenation conditions of from about 175° C. to about 225° C. and hydrogen partial pressures of from about 400 p.s.i. to about 1400 p.s.i. to convert the sludge to aluminum trichloride and hydrocarbon.

6. A process for the recovery of aluminum trichloride from an aluminum trichloride-hydrocarbon sludge which comprises hydrogenating the sludge in the presence of about 45 to 95 percent weight antimony trichloride, calculated on the basis of total antimony trichloride plus sludge, and from about 4% to about 12% volume hydrogen chloride, basis hydrogen plus hydrogen chloride, under hydrogenation conditions of from about 175° C. to about 225° C. and hydrogen partial pressures of from about 400 p.s.i. to about 1400 p.s.i. to convert the sludge to aluminum trichloride and hydrocarbon and recovering said aluminum trichloride as a liquid in admixture with the antimony trichloride.

7. In a process for the conversion of hydrocarbons in the presence of a catalyst comprising aluminum trihalide and antimony trihalide wherein an aluminum trihalide-hydrocarbon sludge is formed, halide being selected from chloride and bromide, the improvement comprising hydrogenating the sludge in the presence of at least 0.5 percent weight antimony trihalide, calculated on the basis of total antimony trihalide plus sludge, under hydrogenation conditions of from about 150° C. to about 250° C. and hydrogen partial pressures of from about 200 p.s.i. to about 2500 p.s.i. to convert the sludge to aluminum trihalide and hydrocarbon, recovering said aluminum trihalide in admixture with the antimony trihalide and using the recovered aluminum trihalide for the conversion of further quantities of hydrocarbons.

8. In a process for the isomerization of hydrocarbons in the presence of a catalyst comprising aluminum trichloride and antimony trichloride wherein an aluminum trichloride-hydrocarbon sludge is formed, the improvement comprising hydrogenating the sludge in the presence of about 5 to 99 percent weight antimony trichloride, calculated on the basis of total antimony chloride plus sludge, and hydrogen chloride under hydrogenation conditions of from about 175° C. to about 225° C. and hydrogen partial pressures from about 400 p.s.i. to about 1400 p.s.i. to convert the sludge to aluminum trichloride and hydrocarbon, recovering said aluminum trichloride in admixture with the antimony trichloride and using the recovered aluminum trichloride for the isomerization of further quantities of hydrocarbons.

References Cited by the Examiner

UNITED STATES PATENTS 2,293,891   8/1942   Evering et al. _____ 208—13

ALPHONSO D. SULLIVAN, *Primary Examiner.*